(12) United States Patent
Butcher

(10) Patent No.: US 10,578,237 B2
(45) Date of Patent: Mar. 3, 2020

(54) APPARATUS FOR ATTACHMENT OF ACCESSORIES TO PROCESSING EQUIPMENT

(71) Applicant: Temptronic Corporation, Mansfield, MA (US)

(72) Inventor: Dana Butcher, Somerville, MA (US)

(73) Assignee: Temptronic Corp., Mansfield, MA (US)

( * ) Notice: Subject to any disclaimer, the term of this patent is extended or adjusted under 35 U.S.C. 154(b) by 548 days.

(21) Appl. No.: 15/235,707

(22) Filed: Aug. 12, 2016

(65) Prior Publication Data

US 2017/0059073 A1 Mar. 2, 2017

Related U.S. Application Data

(60) Provisional application No. 62/212,037, filed on Aug. 31, 2015.

(51) Int. Cl.
*F16L 37/22* (2006.01)
*F16L 37/10* (2006.01)
(Continued)

(52) U.S. Cl.
CPC ............ *F16L 37/22* (2013.01); *F16L 25/065* (2013.01); *F16L 37/05* (2013.01); *F16L 37/086* (2013.01); *F16L 37/101* (2013.01)

(58) Field of Classification Search
CPC ......... F16L 37/22; F16L 37/05; F16L 37/101; F16L 37/086; F16L 25/06; F16L 25/065;
(Continued)

(56) References Cited

U.S. PATENT DOCUMENTS 1,371,882 A * 3/1921 Ferguson ............. F16L 37/101
285/279
3,191,972 A * 6/1965 Collar .................. F16L 37/101
285/279

(Continued)

FOREIGN PATENT DOCUMENTS

CN 1398335 A 7/2004
CN 101479515 A 7/2009
(Continued)

OTHER PUBLICATIONS

International Search Report and Written Opinion in corresponding PCT Application No. PCT/US2016/049452, dated Nov. 18, 2016 (11 Pages).

(Continued)

*Primary Examiner* — Anna M Momper
*Assistant Examiner* — William S. Choi
(74) *Attorney, Agent, or Firm* — Burns & Levinson; Steven M. Mills

(57) ABSTRACT

A temperature-controlled fluid processing system with accessory attachment mechanism includes an accessory annular ring feature a mounting surface and a tapered surface sloping toward a central axis of the ring feature and away from the mounting surface, and engaging components on the primary device, including concentric annular member and rotation plate. The annular member includes spaced apart through holes housing spring biased pins. The rotation plate surrounds the annular member, and includes one or more ramped inner surface(s). The plate is rotatable between an unattached position wherein the ramped surfaces apply no radial inward force to the spring-biased pins, and an attached position wherein each ramped surface displaces a pin inward through its corresponding through hole such that the conical tip of the spring-biased pin engages the tapered surface of the ring feature, thereby immobilizing the accessory with respect to a head unit of the fluid processing device.

8 Claims, 11 Drawing Sheets

(51) Int. Cl.
*F16L 37/05* (2006.01)
*F16L 37/086* (2006.01)
*F16L 25/06* (2006.01)

(58) Field of Classification Search
CPC . F16L 37/12; F16L 37/24; F16L 27/08; F16L 23/02; F16L 23/036; F16B 21/16; F16B 21/065
USPC ........ 285/317, 41, 304, 91, 147.2, 272, 279, 285/280, 405, 414, 412
See application file for complete search history.

(56) References Cited

U.S. PATENT DOCUMENTS

| | | | |
|---|---|---|---|
| 5,634,737 | A | 6/1997 | Voss et al. |
| 5,762,437 | A | 6/1998 | Neilson et al. |
| 6,050,741 | A | 4/2000 | Aultman et al. |
| 6,368,012 | B1 | 4/2002 | St. Onge et al. |
| 6,685,383 | B2 | 2/2004 | Rosenfeld |
| 2009/0100945 | A1 | 4/2009 | Stiles |

FOREIGN PATENT DOCUMENTS

| | | | | |
|---|---|---|---|---|
| CN | 201475560 U | | 5/2010 | |
| CN | 101678490 A | | 2/2011 | |
| DE | 2011234 A1 | * | 10/1970 | ............ F16L 37/086 |
| GB | 125016 A | * | 4/1919 | ............ F16L 37/086 |
| GB | 915965 | | 1/1963 | |
| JP | S3722364 Y | | 8/1985 | |
| JP | S62220796 A | | 9/1987 | |
| JP | H08277985 A | | 5/1998 | |
| WO | 2013044903 | | 4/2013 | |

OTHER PUBLICATIONS

Office Action issued in JP Application No. 2018-507574 dated Oct. 8, 2019.

\* cited by examiner

APPARATUS FOR ATTACHMENT OF ACCESSORIES TO PROCESSING EQUIPMENT

RELATED APPLICATIONS

This application claims priority to and benefit of U.S. Provisional Patent Application No. 62/212,037, filed Aug. 31, 2015, the contents of which are incorporated herein by reference in their entirety for all purposes.

BACKGROUND OF THE INVENTION

The present invention generally relates to apparatus for rotatably attaching accessories to processing devices, such as temperature controlled air processing devices.

Fluid processing devices often operate with a variety of modular accessories. Attaching and disconnecting accessories from the primary device can be a time consuming process, and may require use of a tightening tool, such as a wrench. It may be cumbersome, if not impossible, to fit a wrench or other tightening device around accessories to be attached to the processing device.

Thus, an attachment mechanism is needed that provides simplicity of installation and avoidance of the disadvantages of existing technologies. If the attachment mechanism provides attachment by manual rotation only, work performance and efficiency can be greatly improved.

SUMMARY

Objects and features for overcoming the issues with existing technologies described above are provided by the exemplary descriptive embodiments of accessory attachment apparatus below. In one such embodiment, an accessory attachment apparatus may comprise a ring feature, an annular member, one or more spring-biased pins and a rotation plate. The ring feature may be fixedly attached to, or integrally formed upon, an accessory to be connected to a processing device. The ring feature may define a central axis, and include a mounting surface for interfacing with the processing device, and a tapered surface sloping toward the central axis and away from the mounting surface. The annular member may be fixedly attached to a mounting surface formed on the processing device, whose purpose is to interface with the mounting surface of the ring feature.

The annular member may have an inner surface dimensioned to concentrically face at least a portion of the tapered surface of the ring feature when the accessory is attached to the processing device. The annular member (e.g., a mounting ring, etc.) may be configured with a plurality of spaced apart radial through holes extending through the annular member from an outer surface to the inner surface. The through holes may be equally spaced apart, or otherwise configured depending upon the geometry of the accessory. Disposed in the through holes may be a corresponding plurality of spring-biased pins, each including a head on one end, a conical tip on the other end for engaging the tapered surface, and a spring biasing the respective pin to resist the engagement with the tapered surface.

The rotating plate may be disposed around the annular member, and include an inner surface dimensioned and positioned to oppose the outer surface of the annular member when the accessory is attached to the processing device. The inner surface of the rotating plate may have a plurality of ramps each corresponding to one or more of the spring-biased pins. The ramps may be formed circumferentially in the inner surface of the rotating plate and may be configured to receive at least one of the heads of the plurality of spring-biased pins. The plate may be rotated reciprocally between positions wherein the accessory is unattached or attached to the processing device. Rotating the plate causes the pins to slide along the ramped surface between 'high' (minimum distance between the inner surface of the plate and the outer surface of the annular member) and 'low' (maximum distance between the inner surface of the plate and the outer surface of the annular member distance) ramp positions. In the 'low' ramp position, no radial inward force is applied by the ramp surface to the spring-biased pins, and in turn the accessory is not secured to the device by the pins. In the 'high' ramp position, the engagement of the pin(s) with a respective ramp surface results in exertion of a force directed radially inward that longitudinally displaces the spring-biased pin inward through its respective through hole such that the conical tip of the spring-biased pin engages the tapered surface of the ring feature. The engagement of the conical tip(s) of the spring-biased pin(s) results in immobilization of the accessory with respect to the device.

In another embodiment, the ring feature defines an inlet through which fluids may be received by the accessory from the processing device.

In another embodiment, the processing device comprises a head unit of a temperature controlled air forcing system.

In certain embodiments, the rotating plate may include one or more stop features formed at either or both ends the ramp surface(s) for preventing over-rotation of the rotating plate by limiting the sliding trajectory of the spring-biased pin(s) to the circumferential path of the respective ramp surface.

In another embodiment, the rotating plate may have one or more detents formed in the 'high' ramp position(s) for receiving a corresponding head of a spring-biased pin such that the detent provides a resistive force preventing unintended motion of the pin from the accessory attached position.

In yet another embodiment, a temperature-controlled fluid processing system including a fluid chiller, controller, head unit, and an accessory attachment mechanism as identified above. A wide range of accessories and devices may be attached with the inventive attachment mechanism. In certain embodiments, the accessories may include pipes, flexible hoses, hoods, shrouds or other enclosures for providing temperature controlled environments for test articles or devices.

BRIEF DESCRIPTION OF THE FIGURES

The foregoing and other objects, features and advantages will be apparent from the following, more particular description of the embodiments, as illustrated in the accompanying figures, wherein like reference characters generally refer to identical or structurally and/or functionally similar parts throughout the different views. The figures are not necessarily to scale, emphasis instead being placed upon illustrating the principles of the embodiments, wherein.

DETAILED DESCRIPTION

Figure 1:
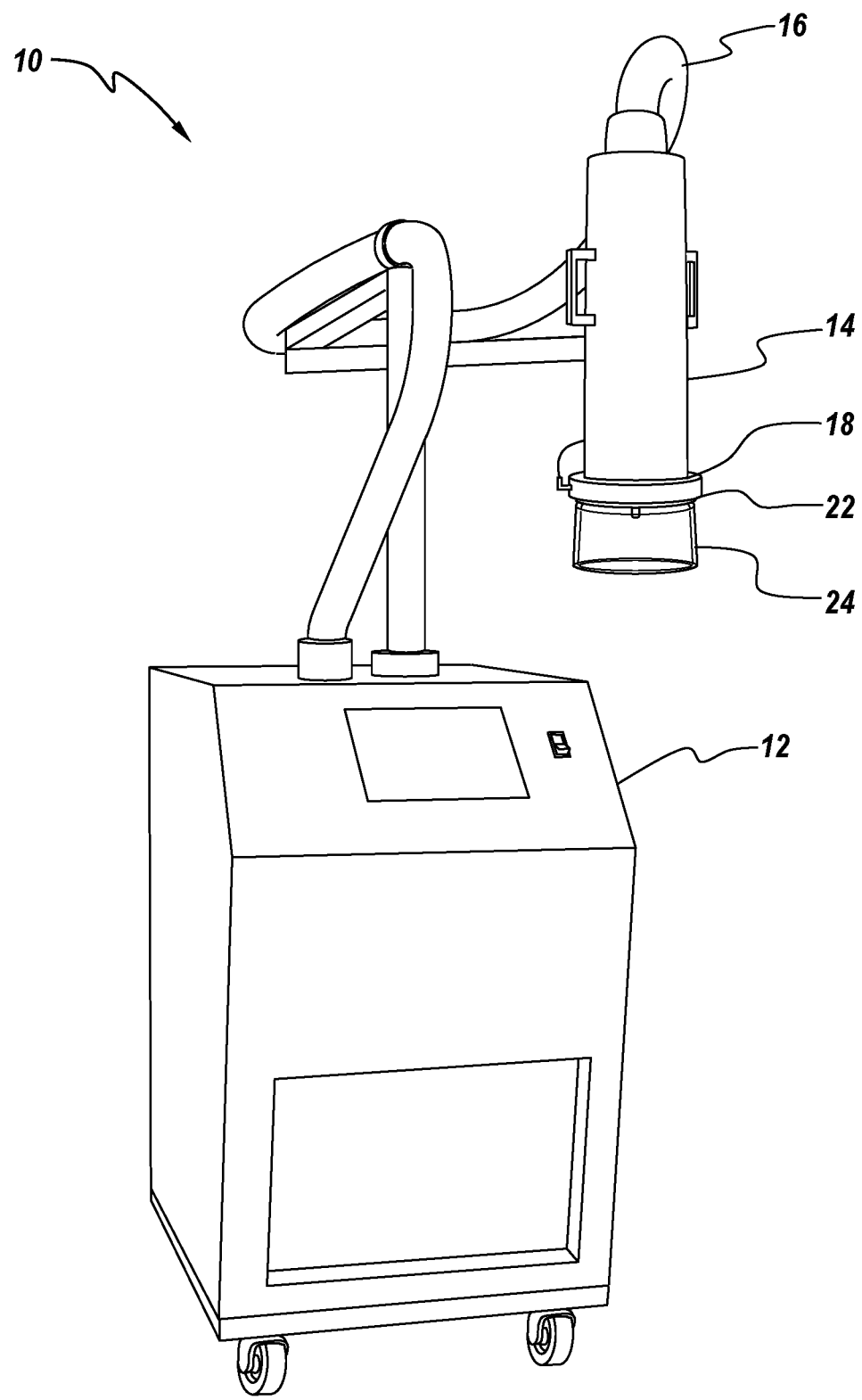
FIG. 1 is a schematic perspective view of a temperature-controlled air forcing system.

In the description that follows, like components may be given the same reference characters, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples. Reference will now be made in detail to presently preferred embodiments of the invention, one or more examples of which are illustrated in the drawings. Each example is provided to explain the invention, and is not meant as a limitation of the invention. For example, features illustrated or described as part of one embodiment, can be used in another embodiment to yield still a further embodiment. It is intended that the present description include such modifications and variations as come within the scope and spirit of the invention.

FIG. 1 shows a schematic perspective view of a temperature-controlled fluid processing system (e.g, an air forcing system) 10. According to some exemplary embodiments, the temperature-controlled air forcing system 10 may comprise a THERMOSTREAM® Air Forcing System, as manufactured and sold by inTEST Thermal Solutions Corporation of Mansfield, Mass., or other similar system.

Air forcing system 10 may include a chiller/controller unit 12, including a refrigeration system for generating a stream of dry, cold gas (e.g., air), or other fluid. The chilled air may be directed into a fluid conveyor, such as a tube and hose system 16, which directs the air into a head unit 14. Head unit 14 may include a heater for heating the chilled air, such that temperature of the air can be precisely controlled. The temperature-controlled air may exit head 14 through an outlet 18.

Figure 2:
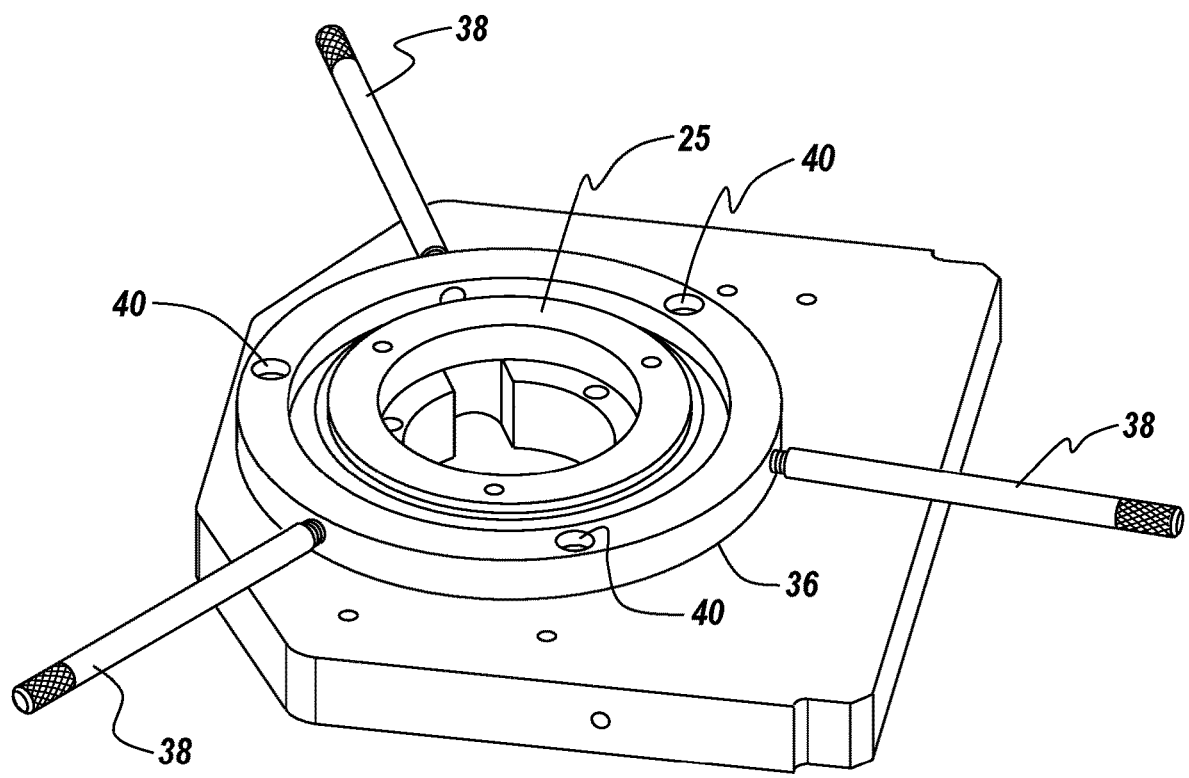
FIG. 2 is a schematic perspective view of a conventional accessory attachment mechanism.

It is desirable to attach interchangeable accessories to the outlet 18 of head 14. FIG. 2 includes a schematic perspective view of a prior accessory attachment mechanism. A first mounting ring 25 may be fixedly attached to or integrally formed with an accessory (not shown) and secured by three extended-length thumbscrews 38 protruding from holes formed through a second mounting ring 36. Second mounting ring 36 may be fixedly attached to the end of head 14 as shown, such as by multiple screws 40. In prior systems using this means of attachment, typical drawbacks include bent, broken, stripped and/or lost thumbscrews, potentially degrading alignment and fluidic seal tightness, as well as injury to the operator. While bolts may provide secure fixation of an accessory to a device, they require individual installation and tightening, usually with an external tightening tool. It may be cumbersome, if not impossible, to fit a wrench or other tightening device onto a clamping nut or bolt depending on the accessory to be attached to the processing device.

Figure 3:
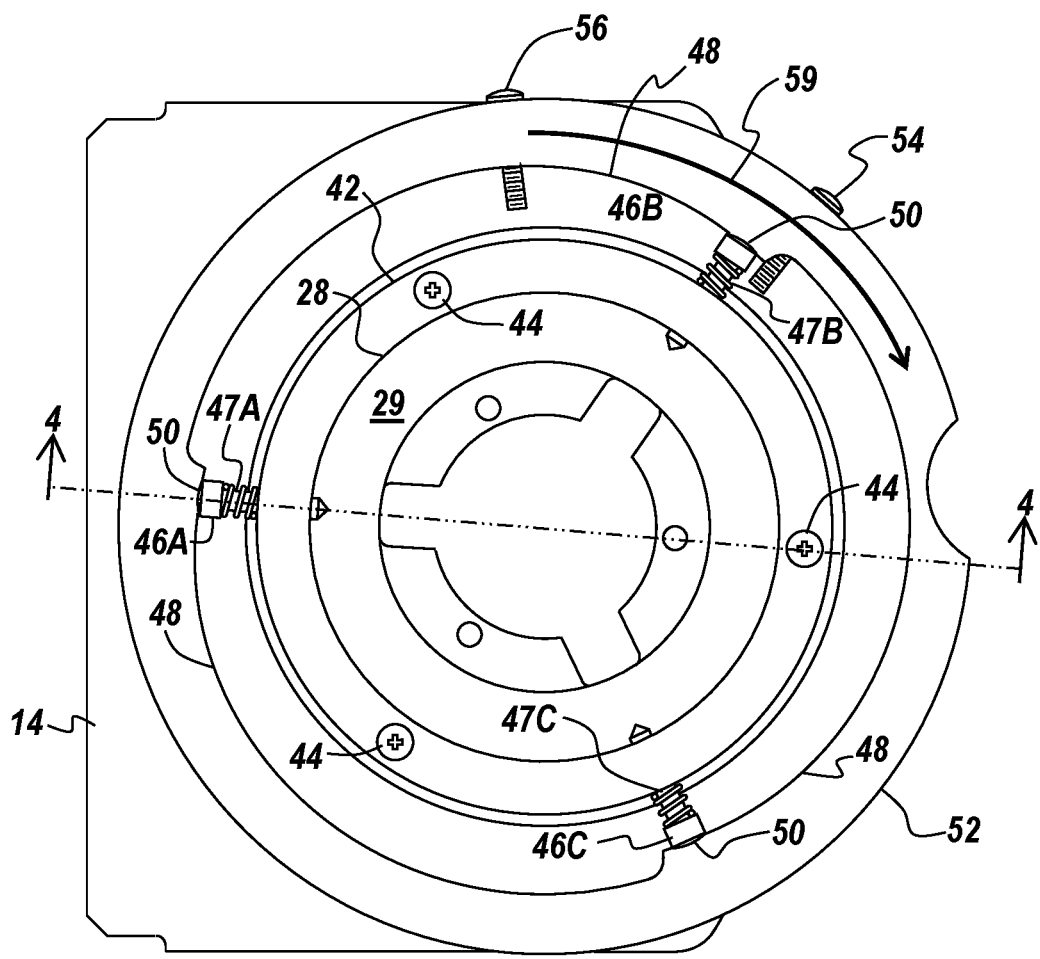
FIG. 3 is a schematic elevation view of an exemplary attachment mechanism in an attached, closed or assembled state.
Figure 10A:
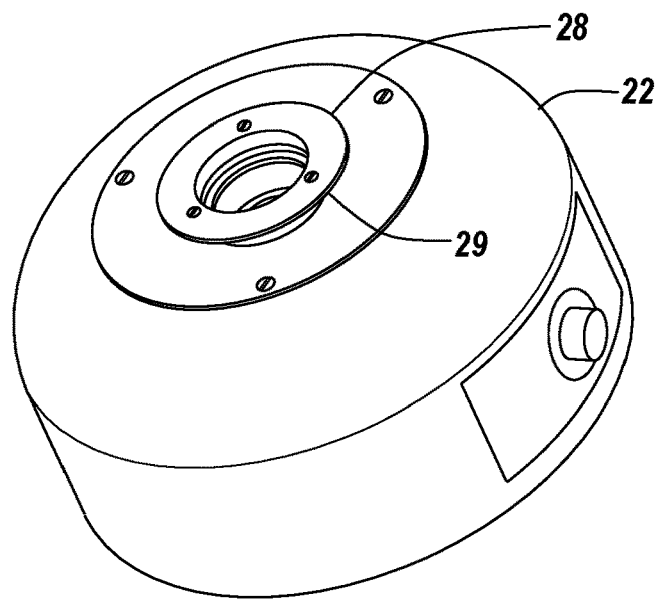
FIGS. 10A and 10B are views of an exemplary T-Cap accessory.
Figure 10B:
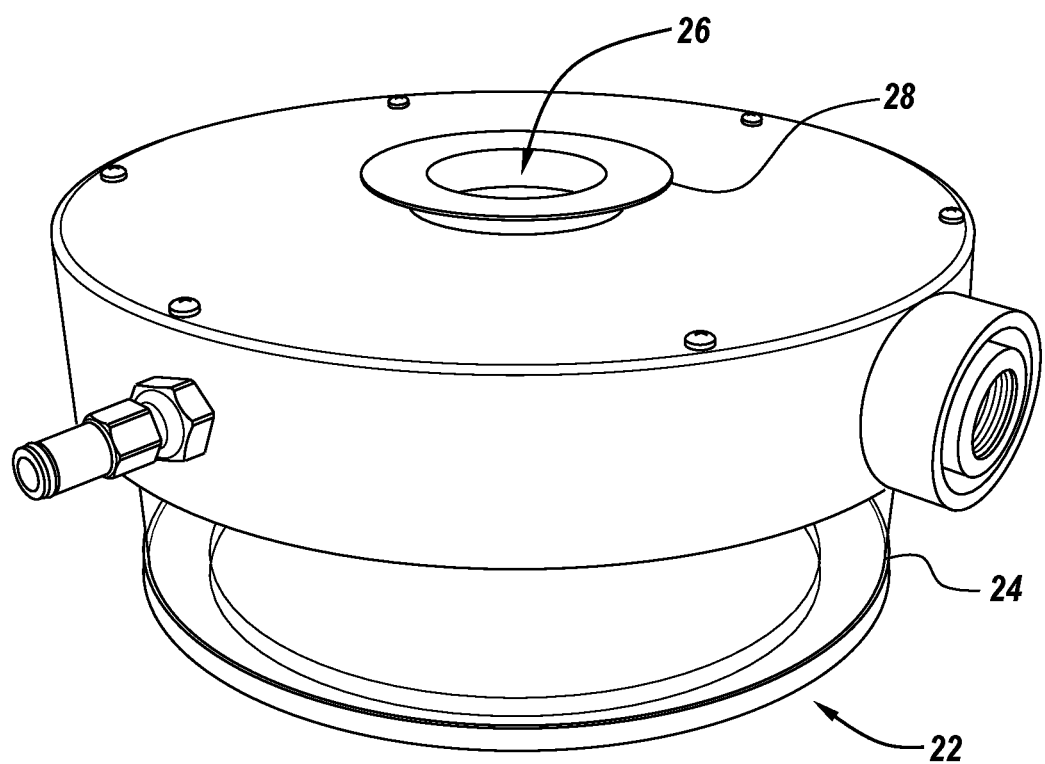

For example, a "T-Cap" thermal cap accessory 22 (as shown in FIGS. 1, 10A and 10B) is commonly attached. T-Cap accessory 22 may include an inlet 26 (FIG. 10B) through which a fluid such as forced air from outlet 18 of head 14 passes when attached. Accessory 22 may also include a shroud 24 that can be used to surround and at least partially enclose a device under test (DUT) within a small temperature-controlled environment. Referring to FIG. 3, accessory 22 may attach to the outlet end of head 14 via an attachment mechanism, which may comprise a tapered or beveled ring 28, an annular member such as an attachment ring or cup 42, one or more spring-biased pins 46A-46C, and a rotation plate 52. Taper ring 28 may be fixedly attached or integrally formed in the top mounting surface of accessory 22.

Figure 11:
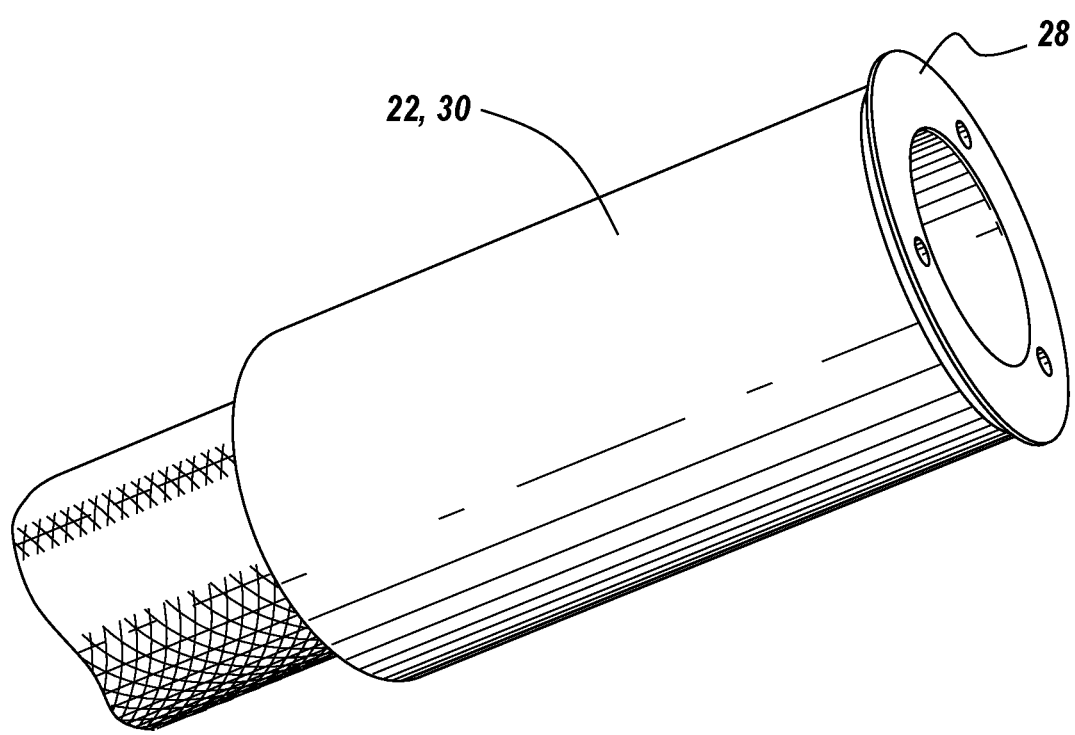
FIG. 11 is a view of an exemplary pipe and/or flexible hose accessory.

Other interchangeable accessories may also be attached to head 14 via the attachment mechanism. That is, various housings, shrouds, enclosures, and other devices may be attached to the processing device 10. For example, FIG. 11 illustrates a pipe and/or flexible hose 30, which includes a beveled cylindrical taper ring 28 at its end for attachment to head 14 via the attachment mechanism. In another embodiment shown in FIG. 12, accessory 22 may comprise a hood, shroud or enclosure 32 may include the taper ring 28. Each configuration of accessory 22 includes taper ring 28 mounted to or integrally formed in the mounting surface of an accessory 22.

Figure 4:
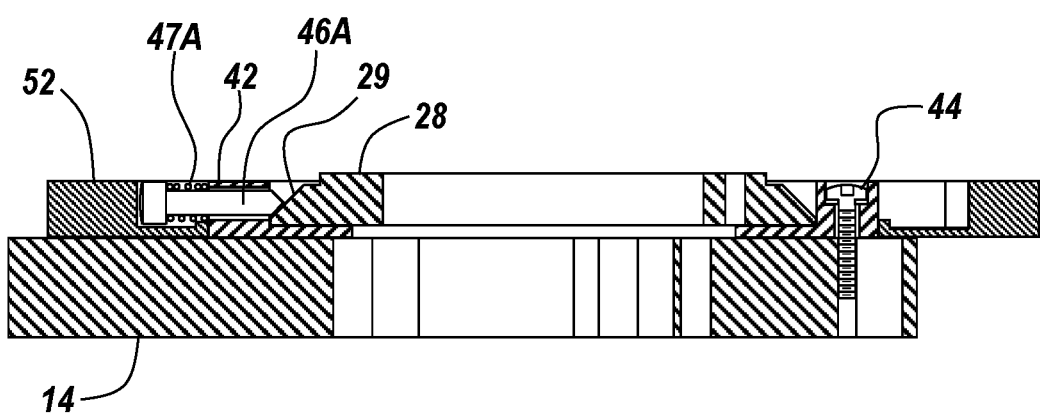
FIG. 4 is a schematic cross-sectional view of the exemplary attachment mechanism depicted in FIG. 3, taken along cut lines shown in FIG. 3.
Figure 9:
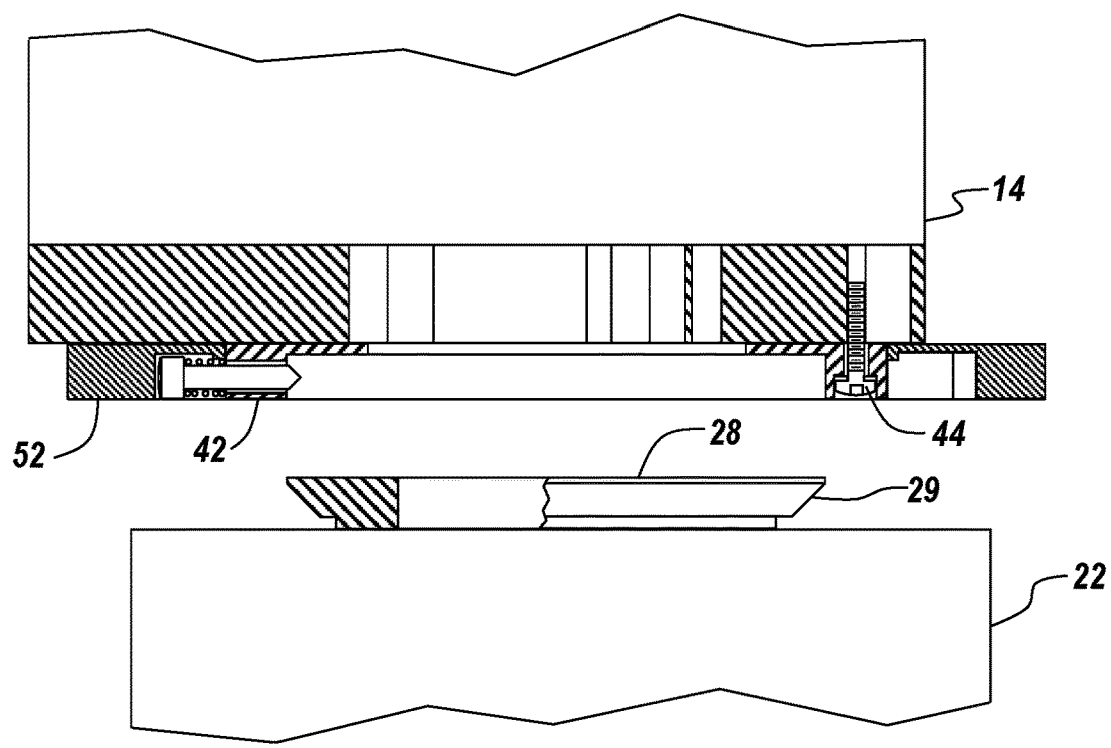
FIG. 9 is a schematic cross-sectional view of an exemplary head of a processing device and accessory prior to attachment of accessory.

FIG. 9 illustrates a tapered or beveled surface 29 of taper ring 28. As shown in FIG. 4, the beveled surface 29 of taper ring 28 is configured to engage conical tips of spring-biased pins 46A-46C protruding from through holes formed in attachment ring 42. Attachment ring 42 may be fixedly attached to the end of head 14.

Figure 5:
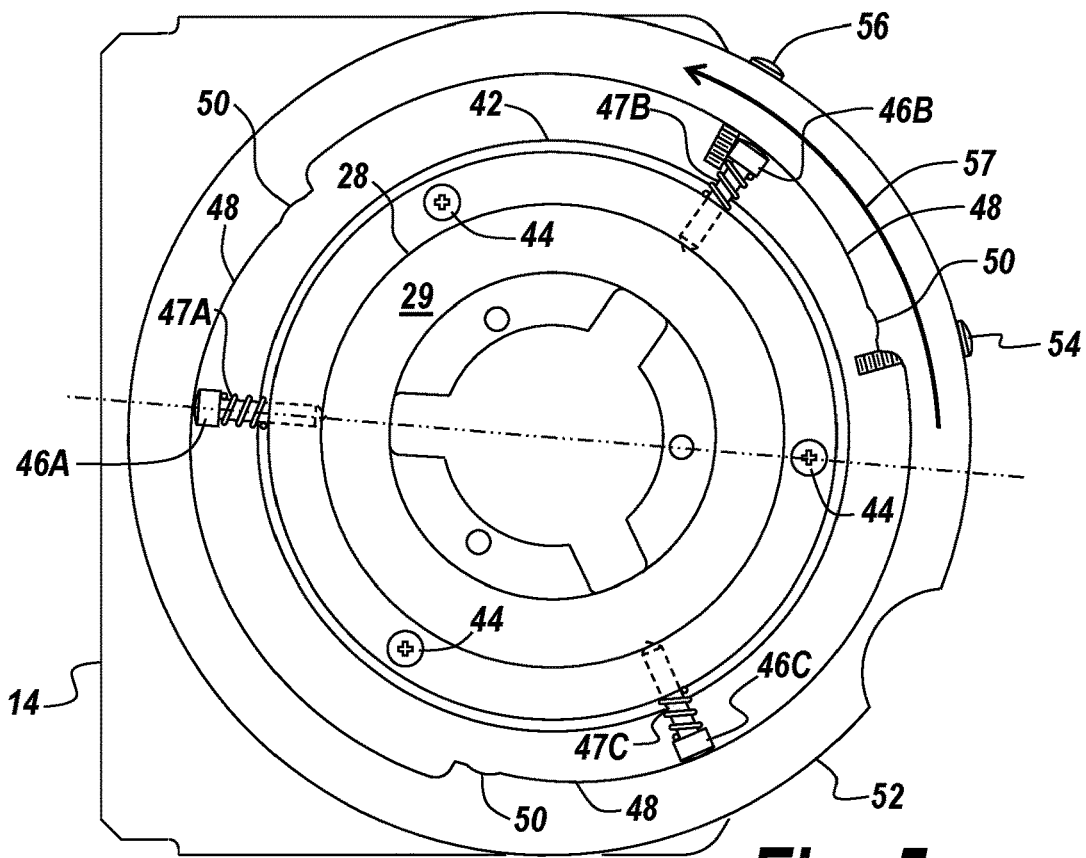
FIG. 5 is a schematic elevation view of an exemplary embodiment of the attachment mechanism in the detached, open or disassembled state.
Figure 6:
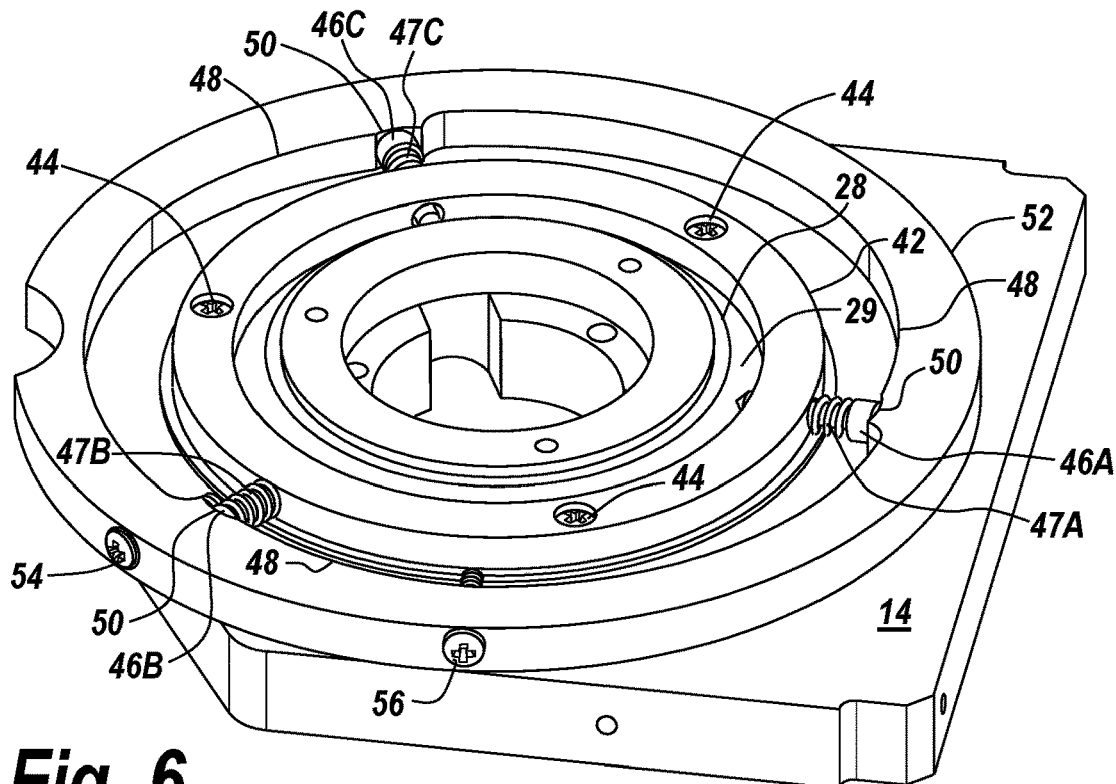
FIG. 6 is a schematic perspective view of an exemplary embodiment of the attachment mechanism in the attached, closed or assembled state.
Figure 7:
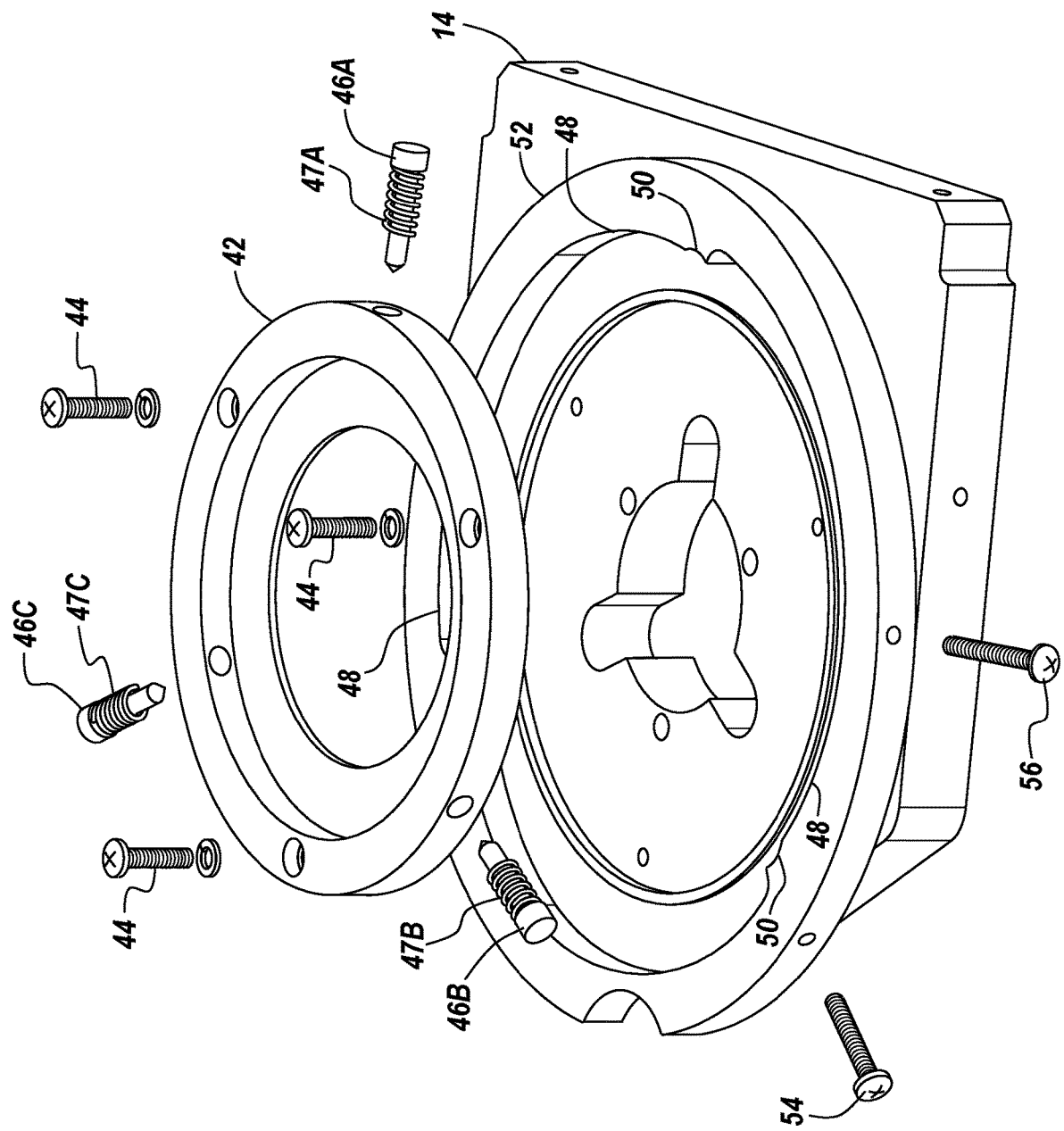
FIG. 7 is a schematic partial perspective exploded view of an exemplary embodiment of the attachment mechanism.
Figure 8:
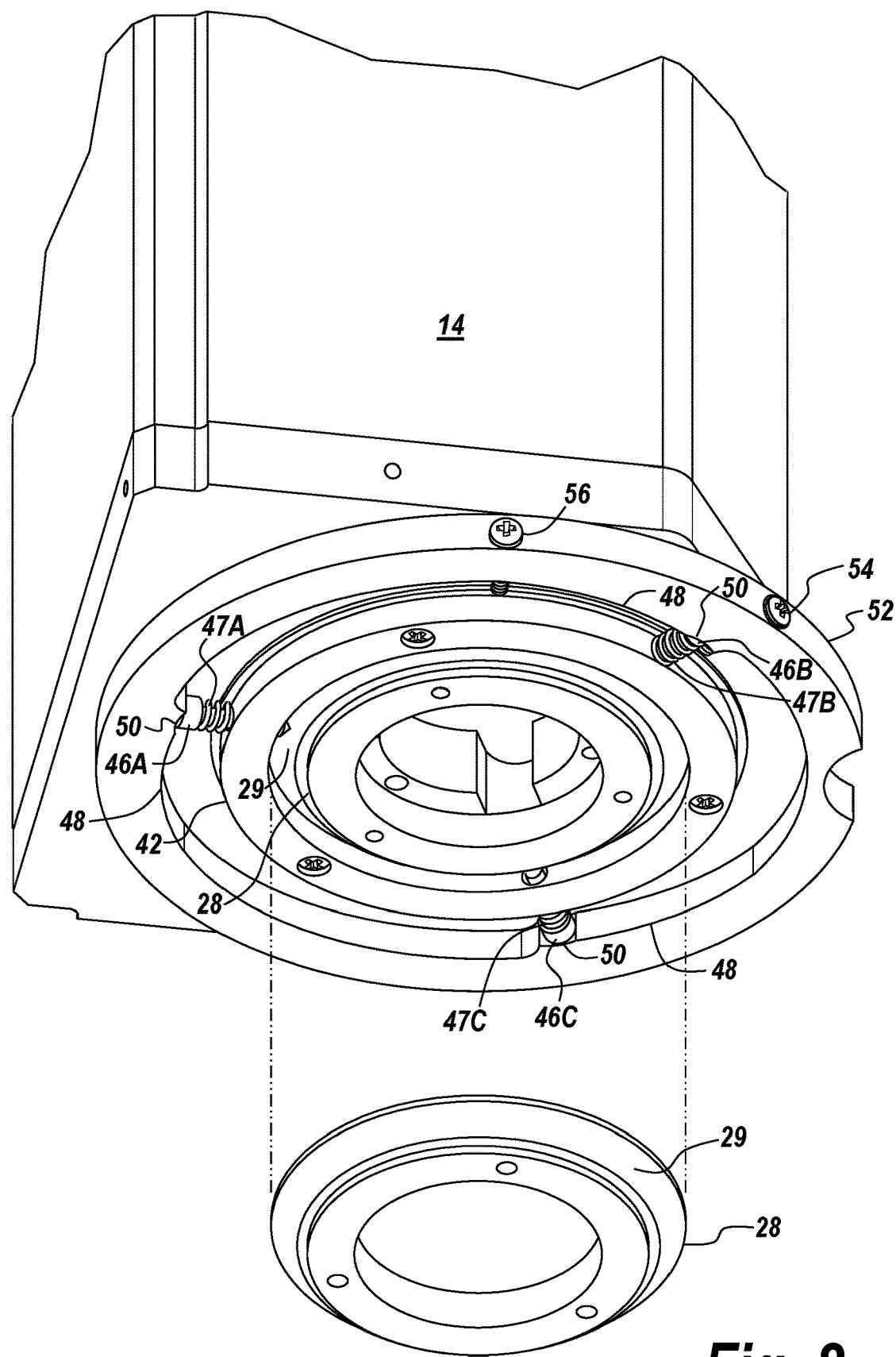
FIG. 8 is another schematic partial perspective exploded view of an exemplary embodiment of the attachment mechanism.

FIGS. 3 through 8 illustrate the improved attachment mechanism, referred to herein as a "bayonet" attachment mechanism, used to attach an accessory 22 to processing device 10, e.g., the air forcing system illustrated in FIG. 1. Specifically, FIG. 3 is a schematic elevation view of the attachment mechanism in the attached, closed or assembled state. FIG. 4 is a schematic cross-sectional view taken along cut lines shown in FIG. 3. FIG. 5 is a schematic elevation view of the attachment mechanism in the detached, open or disassembled state. FIG. 6 is a schematic perspective view of the attachment mechanism in the attached, closed or assembled state. FIG. 7 is a schematic partial perspective exploded view of the attachment mechanism. FIG. 8 is another schematic partial perspective exploded view of the attachment mechanism.

Referring to FIGS. 3 through 8, according to exemplary embodiments, substantially cylindrical attachment ring (or cup) 42 may be fixedly attached to processing device 10, specifically, head 14, for example, by screws 44. Attachment ring 42 may be positioned to surround taper ring 28 on accessory 22 when accessory 22 is attached to head 14. One or more of pins 46A-46C may be disposed in spring-loaded fashion by springs 47A-47C, respectively, through holes in attachment ring 42, as shown. Pins 46A-46C slide longitudinally within their respective holes against the spring force of springs 47A-47C, respectively. Pins 46A-46C have conical tips that engage beveled or tapered surface 29 of taper ring 28 when accessory 22 is attached to and assembled on head 14. To that end, when accessory 22 is attached to and assembled on head 14, pins 46A-46C are displaced longitudinally against spring force of springs 47A-47C, respectively, such that the conical tips of pins 46A-46C engage beveled surface 29 of taper ring 28.

According to exemplary embodiments, pins 46A-46C may be displaced into engagement with taper ring 28 by rotation of rotation plate 52. Specifically, rotation plate 52 is disposed to surround attachment ring 42. During assembly or attachment, taper ring 28 of accessory 22 is disposed within the opening in attachment ring 42, and rotation plate 52 is rotated. During rotation in a first attaching direction, illustrated in FIG. 5 by arrow 57, ramps 48 on rotation plate 52 engage pins 46A-46C at their heads to force them into longitudinal displacement, i.e., radial displacement with respect to the center of rotation ring 52, attachment ring 42 and taper ring 28, due to a decrease in the distance between the ramped surface of rotation plate 52 and the outer surface of the attachment ring 42 and the pins 46A-46C. When rotation plate 52 is rotated sufficiently for attachment, conical tips of pins 46A-46C sufficiently engage with beveled surface 29 of taper ring 28 to immobilize accessory 22 with respect to head 14 of processing device 10. At this fixed or attached position, as illustrated in FIGS. 3, 4 and 5, heads of pins 46A-46C may engage respective detents 50 at the ends of respective ramps 48 in rotation ring 52.

To detach the accessory 22, the rotational attachment process is reversed. That is, rotation ring 52 is rotated in the direction indicated by arrow 59 in FIG. 3. As the rotation ring 52 is rotated in this direction, springs 47A-47C force their respective pins 46A-46C into displacement radially away from the center of rotation ring 52, attachment ring 42 and taper ring 28. As a result of this displacement, conical tips of pins 46A-46C come out of engagement with beveled surface 29 of taper ring 28, thus releasing accessory 22 from head 14.

In some exemplary embodiments, stops can be included to prevent over-rotation. Specifically, optional stop 54 can be provided to prevent over-rotation past the attached, closed or assembled position, as illustrated in FIG. 3. Also, optional stop 56 can be provided to prevent over-rotation past the detached, open or disassembled position, as illustrated in FIG. 5.

FIG. 9 is a schematic cross-sectional view of head 14 of system 10 and accessory 22 prior to attachment of accessory 22 to head 14, according to some exemplary embodiments. As illustrated in FIG. 9, accessory 22 includes taper ring 28 fixedly attached thereto.

FIGS. 10A and 10B are views of accessory 22, in the case in which accessory 22 is a T-Cap device, as illustrated in FIG. 1, according to some exemplary embodiments. Again, accessory 22 includes taper ring 28 fixedly attached thereto.

FIG. 11 illustrates accessory 22, in the case in which accessory 22 is a pipe and/or flexible hose 30, according to some exemplary embodiments. Accessory 22, i.e., pipe/hose 30, includes beveled cylindrical taper ring 28 at its end for attachment to head 14 via the attachment mechanism, according to exemplary embodiments.

Figure 12:
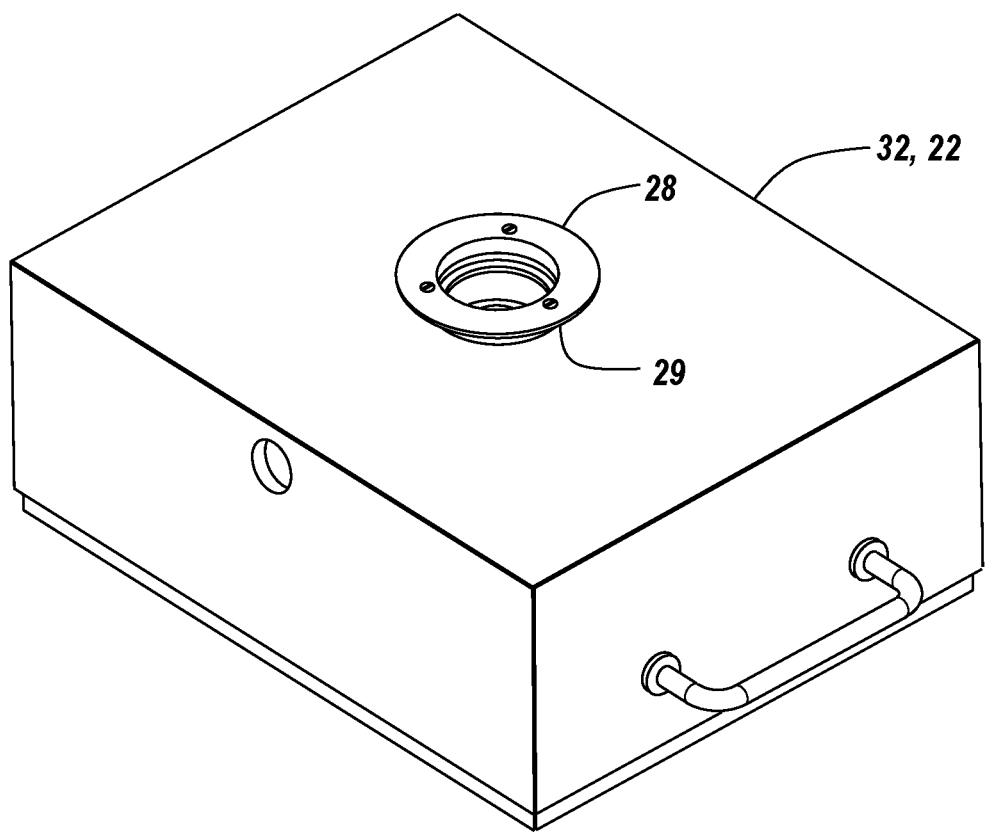
FIG. 12 is a schematic perspective view of an exemplary hood, shroud or enclosure accessory.

FIG. 12 is a schematic perspective view of accessory 22, in the case in which accessory 22 is a hood, shroud or enclosure 32, according to some exemplary embodiments. Again, accessory 22, i.e., hood, shroud or enclosure 32, includes taper ring 28 fixedly attached thereto.

Figure 13:
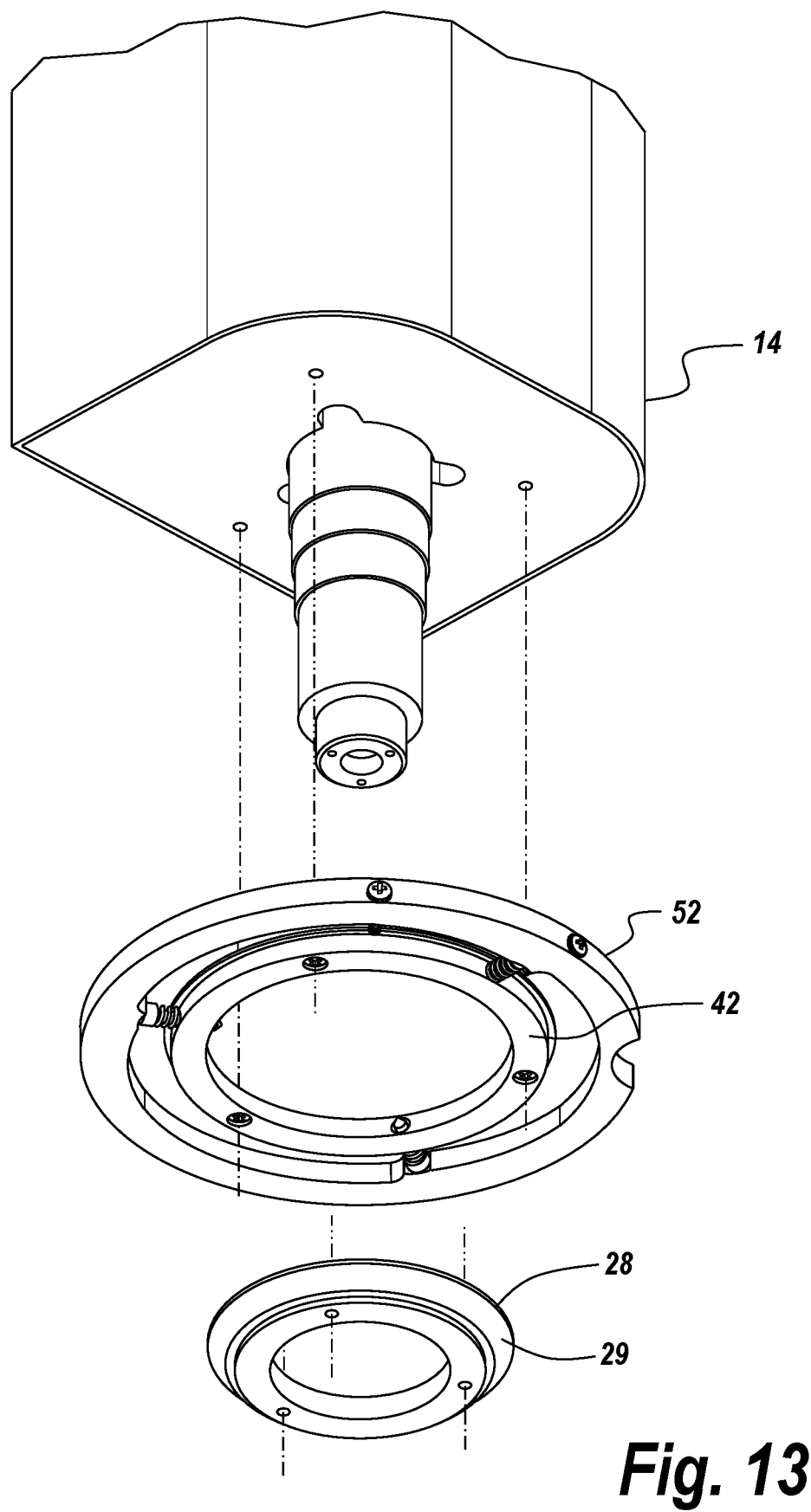
FIG. 13 is a schematic perspective exploded view of exemplary embodiments of a processing device head, taper ring, annular member and rotation plate.

FIG. 13 is a schematic perspective exploded view of head 14, taper ring 28, attachment ring 42 and rotation ring 52, according to some exemplary embodiments.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A temperature-controlled fluid forcing system, comprising:
   a fluid chiller configured to cool a fluid for generating chilled fluid;
   a controller for controlling operation of and fluid flow from the fluid chiller;
   a head unit including: a heater for heating the chilled fluid; an outlet for expelling the chilled fluid; and an annular member fixedly attached to a mounting surface of the head unit and disposed around the outlet, the annular member including an inner surface and an outer surface, and a plurality of spaced apart radial through holes extending through the annular member from the outer surface to the inner surface;
   a corresponding plurality of spring-biased pins disposed in the plurality of radial through holes, each spring-biased pin comprising a head and a conical tip, each spring-biased pin surrounded by a respective coaxial spring which biases the pin to resist longitudinal displacement of the pin from the outer surface through the radial through holes; and
   a rotation plate disposed about the annular member, the rotation plate including an inner surface configured to oppose the outer surface of the annular member, the inner surface having a plurality of ramps circumferentially formed therein and configured to receive at least one of the heads of the plurality of spring-biased pins; and an accessory including a ring feature fixedly attached to or integrally formed therein and having central axis, the ring feature having defined thereon a mounting surface configured to oppose the mounting surface of the head unit and a tapered surface sloping toward the central axis and away from the accessory mounting surface and configured to oppose the inner surface of the annular member when the accessory is attached to the head unit;

wherein:

the rotation plate is rotatable from an unattached position wherein the ramped surfaces apply no radial inward force to the spring-biased pins, to an attached position wherein each ramped surface longitudinally displaces one of the spring-biased pins inward through its corresponding radial through hole such that the conical tip of the spring-biased pin engages the tapered surface of the ring feature, thereby immobilizing the accessory with respect to the head unit; and each spring is disposed between the head of one of the spring-biased pins and the annular member to force the one of the spring-biased pins away from the ring and towards the rotation plate.

2. The temperature-controlled fluid forcing system of claim 1, wherein the ring feature defines an inlet through which fluids may be received by the accessory from the head unit.

3. The temperature-controlled fluid forcing system of claim 1, further comprising one or more stop features formed at an end of a ramp on the inner surface of the rotation plate so as to limit rotation of the rotating plate by preventing a corresponding one or more spring-biased pins from sliding circumferentially past the stop feature.

4. The temperature-controlled fluid forcing system of claim 1, wherein the accessory comprises one of a pipe or a flexible hose.

5. The temperature-controlled fluid forcing system of claim 1, wherein the accessory comprises a temperature controlled enclosure configured to receive a device under test.

6. The temperature-controlled fluid forcing system of claim 1, wherein the annular member comprises a mounting ring.

7. The temperature-controlled fluid forcing system of claim 1, wherein the plurality of spring-biased pins and radial through holes are equally space around the inner surface of the annular member.

8. The temperature-controlled fluid forcing system of claim 1, wherein at least one of the plurality of ramps includes a detent formed therein for receiving and preventing motion of a spring biased pin in the attached position.

* * * * *